(12) United States Patent
Liu et al.

(10) Patent No.: US 8,768,100 B2
(45) Date of Patent: *Jul. 1, 2014

(54) OPTIMAL GRADIENT PURSUIT FOR IMAGE ALIGNMENT

(71) Applicant: General Electric Company, Schenectady, NY (US)

(72) Inventors: Xiaoming Liu, Schenectady, NY (US); Frederick Wilson Wheeler, Niskayuna, NY (US); Peter Henry Tu, Niskayuna, NY (US); Jilin Tu, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,763

(22) Filed: Jul. 1, 2013

(65) Prior Publication Data

US 2013/0294686 A1 Nov. 7, 2013

Related U.S. Application Data

(63) Continuation of application No. 13/052,097, filed on Mar. 20, 2011, now Pat. No. 8,478,077.

(51) Int. Cl.
G06K 9/32 (2006.01)
G06K 9/62 (2006.01)
G06K 9/46 (2006.01)
G06K 9/66 (2006.01)

(52) U.S. Cl.
USPC ............ 382/294; 382/159; 382/195; 382/201

(58) Field of Classification Search
USPC .......................... 382/159, 195, 201, 293–295
See application file for complete search history.

(56) References Cited

U.S. PATENT DOCUMENTS

| 6,020,930 A | 2/2000 | Legrand |
| 7,274,803 B1 | 9/2007 | Sharma et al. |
| 7,711,155 B1 | 5/2010 | Sharma et al. |
| 7,742,623 B1 | 6/2010 | Moon et al. |
| 7,898,522 B2 | 3/2011 | Hildreth et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,974,869 B1 | 7/2011 | Sharma et al. |

(Continued)

OTHER PUBLICATIONS

S. Baker and I. Matthews. Lucas-Kanade 20 years on: A unifying framework. Int. J. Computer Vision, 56(3):221-255, Mar. 2004.

(Continued)

*Primary Examiner* — Amir Alavi
*Assistant Examiner* — Kenny Cese
(74) *Attorney, Agent, or Firm* — Jean K. Testa; Fletcher Yoder, P.C.

(57) ABSTRACT

A method for image alignment is disclosed. In one embodiment, the method includes acquiring a facial image of a person and using a discriminative face alignment model to fit a generic facial mesh to the facial image to facilitate locating of facial features. The discriminative face alignment model may include a generative shape model component and a discriminative appearance model component. Further, the discriminative appearance model component may have been trained to estimate a score function that minimizes the angle between a gradient direction and a vector pointing toward a ground-truth shape parameter. Additional methods, systems, and articles of manufacture are also disclosed.

22 Claims, 11 Drawing Sheets

(56) References Cited

U.S. PATENT DOCUMENTS

| | | | |
|---|---|---|---|
| 7,987,111 | B1 | 7/2011 | Sharma et al. |
| 8,009,863 | B1 | 8/2011 | Sharma et al. |
| 8,027,521 | B1 | 9/2011 | Moon et al. |
| 8,098,887 | B2 | 1/2012 | Inada |
| 8,478,077 | B2 * | 7/2013 | Liu et al. ............... 382/294 |
| 2002/0138830 | A1 | 9/2002 | Nagaoka et al. |
| 2005/0198661 | A1 | 9/2005 | Collins et al. |
| 2007/0271580 | A1 | 11/2007 | Tischer et al. |
| 2007/0292049 | A1 | 12/2007 | Liu et al. |
| 2008/0109397 | A1 | 5/2008 | Sharma et al. |
| 2008/0310759 | A1 | 12/2008 | Liu et al. |
| 2009/0217315 | A1 | 8/2009 | Malik et al. |
| 2009/0285456 | A1 | 11/2009 | Moon et al. |
| 2010/0214288 | A1 * | 8/2010 | Xiao et al. ............. 345/420 |

OTHER PUBLICATIONS

K. Chang, K. Bowyer, and P. Flynn. Face recognition using 2D and 3D facial data. In Proc. ACM Workshop on Multimodal User Authentication, pp. 25-32, Dec. 2003.

T. Cootes, D. Cooper, C. Tylor, and J. Graham. A trainable method of parametric shape description. In Proc. of the British Machine Vision Conference (BMVC), pp. 54-61, Glasgow, UK, Sep. 1991.

T. Cootes, G. Edwards, and C. Taylor. Active appearance models. IEEE Trans. on Pattern Analysis and Machine Intelligence, 23(6):681-685, Jun. 2001.

D. Cristinacce and T. Cootes. Facial feature detection and tracking with automatic template selection. In Proc. of Int. Conf. on Automatic Face and Gesture Recognition (FG), pp. 429-434, Southampton, UK, 2006.

D. Cristinacce and T. Cootes. Boosted regression active shape models. In Proc. of the British Machine Vision Conference (BMVC), vol. 2, pp. 880-889, University of Warwick, UK, 2007.

G. Dedeoglu, T. Kanade, and S. Baker. The asymmetry of image registration and its application to face tracking. IEEE Trans. on Pattern Analysis and Machine Intelligence, 29(5):807-823, May 2007.

R. Donner, M. Reiter, G. Langs, P. Peloschek, and H. Bischof. Fast active appearance model search using canonical correlation analysis. IEEE Trans. on Pattern Analysis and Machine Intelligence, 28(10):1690-1694,2006.

R. Gross, I. Matthews, and S. Baker. Generic vs. person specific active appearance models. J. Image and Vision Computing, 23(11):1080-1093, Nov. 2005.

G. Hager and P. Belhumeur. Efficient region tracking with parametric models of geometry and illumination. IEEE Trans. on Pattern Analysis and Machine Intelligence, 20(10):1025-1039, 1998.

A. Kanaujia and D. Metaxas. Large scale learning of active shape models. In Proc. of the International Conference on Image Processing (ICIP), vol. 1, pp. 265-268, San Antonio, Texas, 2007.

L. Liang, F. Wen, Y. Xu, X. Tang, and H. Shum. Accurate face alignment using shape constrained Markov network. In Proc. of the IEEE Conf. on Computer Vision and Pattern Recognition (CVPR), New York, NY, Jun. 2006.

X. Liu. Generic face alignment using boosted appearance model. In Proc. of the IEEE Conf. on Computer Vision and Pattern Recognition (CVPR), Minneapolis, MI, 2007.

X. Liu. Discriminative face alignment. IEEE Trans. on Pattern Analysis and Machine Intelligence, 31(11):1941-1954, Nov. 2009.

X. Liu, Y. Tong, and F. W. Wheeler. Simultaneous alignment and clustering for an image ensemble. In Proc. of the Intl. Conf. on Computer Vision (ICCV), Kyoto, Japan, Oct. 2009.

X. Liu, Y. Tong, F. W. Wheeler, and P. H. Tu. Facial contour labeling via congealing. In Proc. of the European Conf. on Computer Vision (ECCV), Crete, Greece, Sep. 2010.

X. Liu, P. Tu, and F. Wheeler. Face model fitting on low resolution images. In Proc. of the British Machine Vision Conference (BMVC), vol. 3, pp. 1079-1088, 2006.

X. Liu. Optimal Gradient Pursuit for Face Alignment. Automatic Face & Gesture Recognition and Workshops (GF 2011). 2011 IEEE International Conference, pp. 245-251, Mar. 2011.

I. Matthews and S. Baker. Active appearance models revisited. Int. J. Computer Vision, 60(2):135-164, Nov. 2004.

M. H. Nguyen and F. D. la Torre Frade. Learning image alignment without local minima for face detection and tracking. In Proc. of the British Machine Vision Conference (BMVC), Leeds, UK, 2008.

C. P. Papageorgiou, M. Oren, and T. Poggio. A general framework for object detection. In Proc. of the Intl. Conf. on Computer Vision (ICCV), pp. 555-562, 1998.

P. J. Phillips, H. Moon, P. J. Rauss, and S. Rizvi. The Feret evaluation methodology for face recognition algorithms. IEEE Trans. on Pattern Analysis and Machine Intelligence, 22(10):1090-1104, Oct. 2000.

J. Saragih and R. Goecke. A nonlinear discriminative approach to AAM fitting. In Proc. of the Intl. Conf. on Computer Vision (ICCV), Rio de Janeiro, Brazil, Oct. 2007.

M. B. Stegmann, B. K. Ersboll, and R. Larsen. Fame—A flexible appearance modeling environment. IEEE Trans. on Medical Imaging, 22(10):1319-1331, Oct. 2003.

R. Szeliski and J. Coughlan. Spline-based image registration. Int. J. Computer Vision, 22(3):199-218, 1997.

Y. Tong, X. Liu, F. W. Wheeler, and P. Tu. Automatic facial landmark labeling with minimal supervision. In Proc. of the IEEE Conf. on Computer Vision and Pattern Recognition (CVPR), Miami, FL, Jun. 2009.

B. C. Vemuri, S. Huang, S. Sahni, C. M. Leonard, C. Mohr, R. Gilmore, and J. Fitzsimmons. An efficient motion estimator with application to medical image registration. Medical Image Analysis, 2(1):79-98, Mar. 1998.

P. Viola and M. Jones. Robust real-time face detection. Int. J. Computer Vision, 57(2):137-154, May 2004.

C. Vogler, Z. Li, A. Kanaujia, S. Goldenstein, and D. Metaxas. The best of both worlds: Combining 3D deformable models with active shape models. In Proc. of the Intl. Conf. on Computer Vision (ICCV), Rio de Janeiro, Brazil, Oct. 2007.

O. Williams, A. Blake, and R. Cipolla. Sparse Bayesian learning for efficient visual tracking. IEEE Trans. on Pattern Analysis and Machine Intelligence, 27(8):1292-1304,2005.

M. Wimmer, F. Stulp, S. Pietzsch, and B. Radig. Learning local objective functions for robust face model fitting. IEEE Trans. on Pattern Analysis and Machine Intelligence, 30(18):1357-1370, Aug. 2008.

H. Wu, X. Liu, and G. Doretto. Face alignment via boosted ranking models. In Proc. of the IEEE Conf. on Computer Vision and Pattern Recognition (CVPR), Anchorage, Alaska, 2008.

S. Zhou and D. Comaniciu. Shape regression machine. In Proc. of Int. Conf. on Information Processing in Medical Imaging (IPMI), pp. 13-25, Kerkrade, The Netherlands, Jul. 2007.

Y. Zhou, L. Gu, and H. Zhang. Bayesian tangent shape model: Estimating shape and pose parameters via Bayesian inference. In Proc. of the IEEE Conf. on Computer Vision and Pattern Recognition (CVPR), vol. 1, pp. 109-116, Madison, WI, 2003.

GB Search Report dated Jul. 27, 2012 from corresponding Application No. GB1206744.3.

* cited by examiner

OPTIMAL GRADIENT PURSUIT FOR IMAGE ALIGNMENT

CROSS-REFERENCE TO RELATED APPLICATION

This application is a continuation of application Ser. No. 13/052,097, filed Mar. 20, 2011, entitled "OPTIMAL GRADIENT PURSUIT FOR IMAGE ALIGNMENT", in the name of Xiaoming Liu and assigned to General Electric Company, which is incorporated herein by reference in its entirety.

STATEMENT REGARDING FEDERALLY SPONSORED RESEARCH & DEVELOPMENT

This invention was made with Government support under grant number 2007-DE-BX-K191 awarded by the National Institute of Justice. The Government has certain rights in the invention.

BACKGROUND

The present disclosure relates generally to image alignment and, in some embodiments, to a technique for aligning facial images.

Model-based image registration/alignment is a topic of interest in computer vision, where a model is deformed such that its distance to an image is minimized. In particular, face alignment is of interest as it enables various practical capabilities (e.g., facial feature detection, pose rectification, and face animation) and poses scientific challenges due to facial appearance variations in pose, illumination, expression, and occlusions. Previous techniques include the Active Shape Model (ASM), which fit a statistical shape model to an object class. ASM was extended to the Active Appearance Model (AAM), which has been used in face alignment. During AAM-based model fitting, the Mean-Square-Error between the appearance instance synthesized from the appearance model and the warped appearance from the input image is minimized by iteratively updating the shape and/or appearance parameters. Although AAM may perform reasonably well while learning and fitting on a small set of subjects, its performance degrades quickly when it is trained on a large dataset and/or fit to subjects that were not seen during the model learning.

In addition to the generative model based approaches such as AAM, there are also discriminative model based alignment approaches. The Boosted Appearance Model (BAM) utilizes the same shape model as AAM, but an entirely different appearance model that is essentially a two-class classifier and learned discriminatively from a set of correctly and incorrectly warped images. During model fitting, BAM aims to maximize the classifier score by updating the shape parameter along the gradient direction. Though BAM has shown to generalize better in fitting to unseen images compared to AAM, one potential issue is that the learned binary classifier cannot guarantee a concave score surface while perturbing the shape parameter. In other words, moving along the gradient direction does not always improve the alignment. The Boosted Ranking Model (BRM) alleviates this issue by enforcing the convexity through learning. Using pairs of warped images, where one is a better alignment than the other, BRM learns a score function that attempts to correctly rank the two warped images within all training pairs. While BRM may provide certain benefits over previous techniques, further improvements in image alignment may be achieved as described below.

BRIEF DESCRIPTION

Certain aspects commensurate in scope with the originally claimed invention are set forth below. It should be understood that these aspects are presented merely to provide the reader with a brief summary of certain forms various embodiments of the presently disclosed subject matter might take and that these aspects are not intended to limit the scope of the invention. Indeed, the invention may encompass a variety of aspects that may not be set forth below.

Embodiments of the presently disclosed subject matter may generally relate to image alignment. In one embodiment, a method includes acquiring a facial image of a person and using a discriminative face alignment model to align a generic facial mesh to the facial image to facilitate locating of facial features of the facial image. The discriminative face alignment model may include a generative shape model component and a discriminative appearance model component. The discriminative appearance model component may have been trained with training data to estimate a score function that is a function of a shape parameter of a given image and that seeks to minimize an angle between a gradient direction of the score function for the shape parameter and an ideal alignment travel direction for the shape parameter.

In another embodiment, a system includes a memory device having a plurality of stored routines and a processor configured to execute the plurality of stored routines. The plurality of stored routines may include a routine configured to access a set of training images, and a routine configured to train an appearance model using the set of training images to learn an alignment score function that minimizes angles between gradient directions of the alignment score function and ideal travel directions to a desired alignment.

In an additional embodiment, a manufacture includes one or more non-transitory, computer-readable media having executable instructions stored thereon. The executable instructions may include instructions adapted to access an image including a human face and instructions adapted to align the human face using a discriminative face alignment model. The discriminative face alignment model may include a discriminative appearance model trained to estimate an alignment score function that minimizes angles between gradient directions of the alignment score function and vectors pointing in the direction of the maximum of the alignment score function.

Various refinements of the features noted above may exist in relation to various aspects of the subject matter described herein. Further features may also be incorporated in these various aspects as well. These refinements and additional features may exist individually or in any combination. For instance, various features discussed below in relation to one or more of the illustrated embodiments may be incorporated into any of the described embodiments of the present disclosure alone or in any combination. Again, the brief summary presented above is intended only to familiarize the reader with certain aspects and contexts of the subject matter disclosed herein without limitation to the claimed subject matter.

DRAWINGS

These and other features, aspects, and advantages of the present technique will become better understood when the following detailed description is read with reference to the accompanying drawings in which like characters represent like parts throughout the drawings, wherein.

Figure 8:
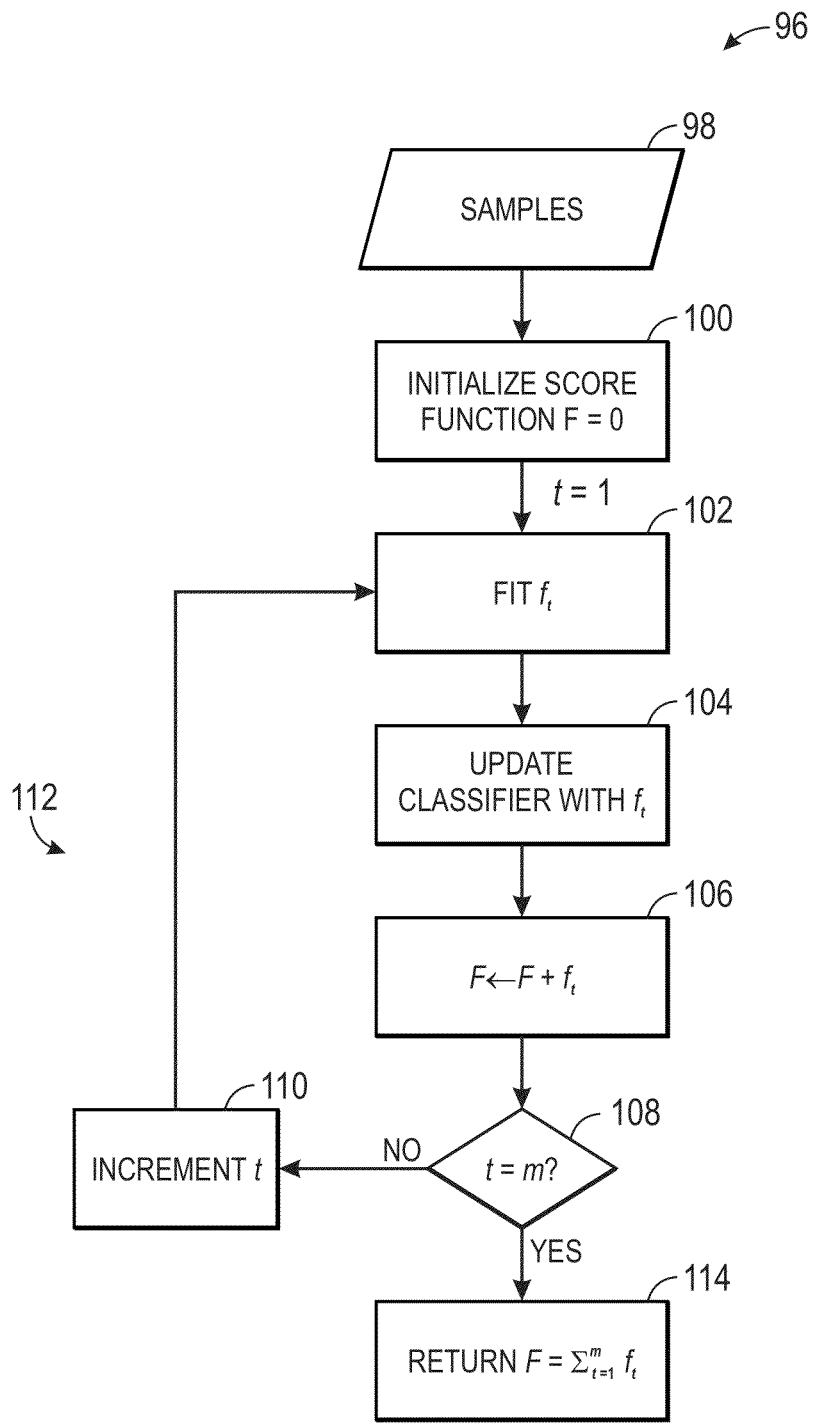
Figure 9:
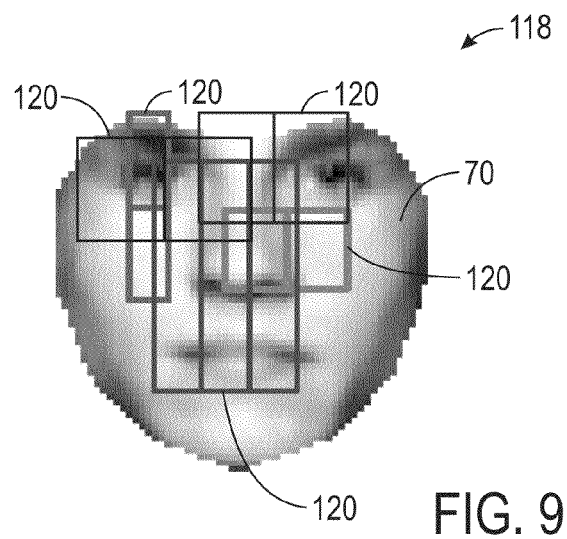
Figure 10:
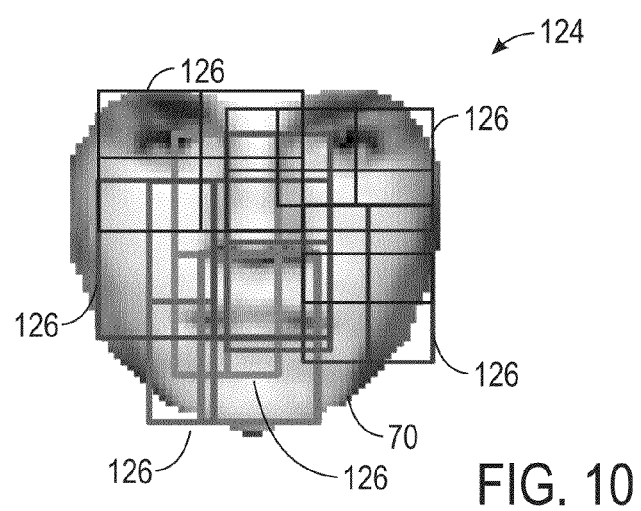
Figure 11:
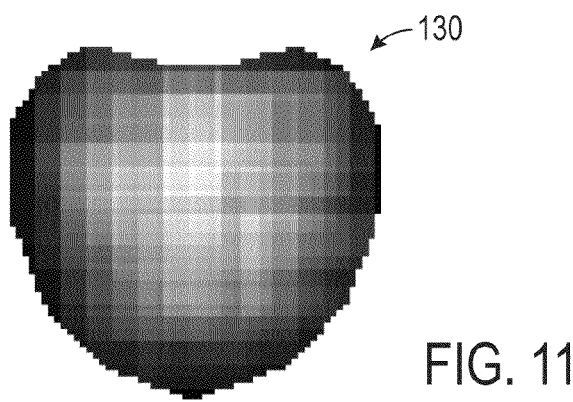
Figure 12:
Figure 13:
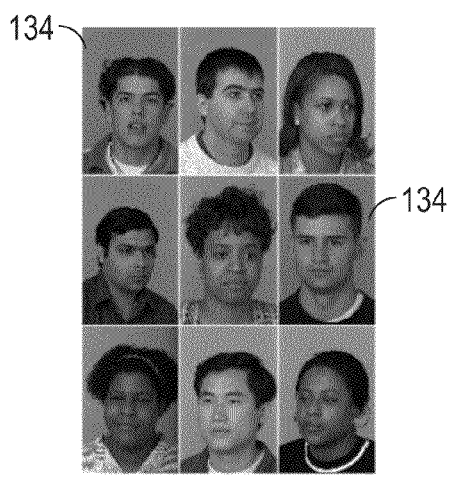
Figure 14:
Figure 15:
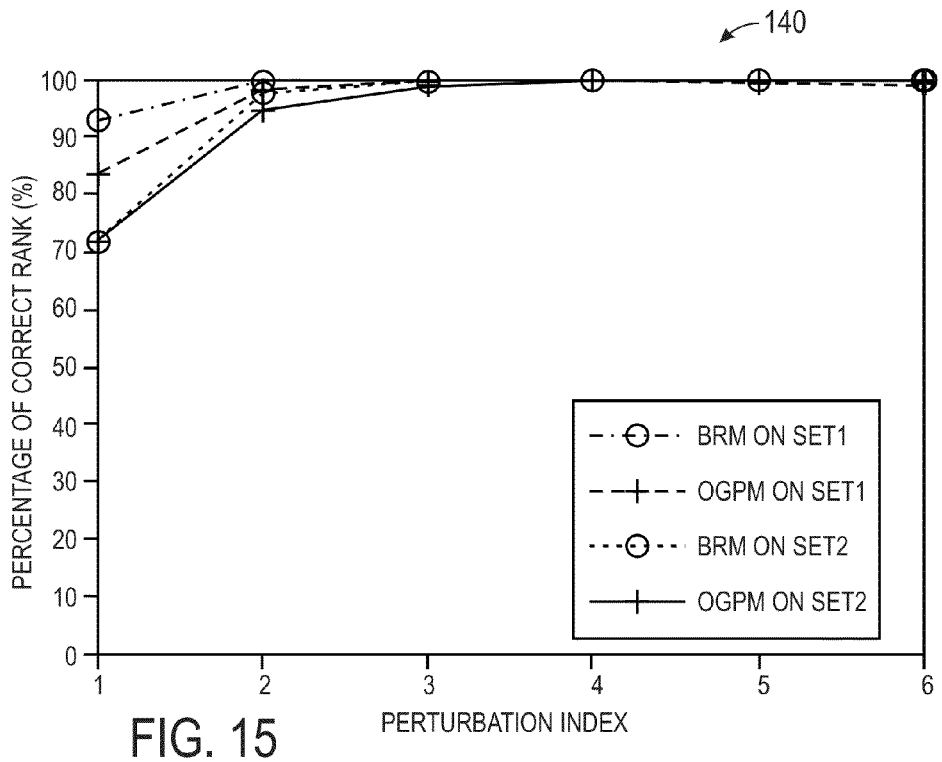
Figure 16:
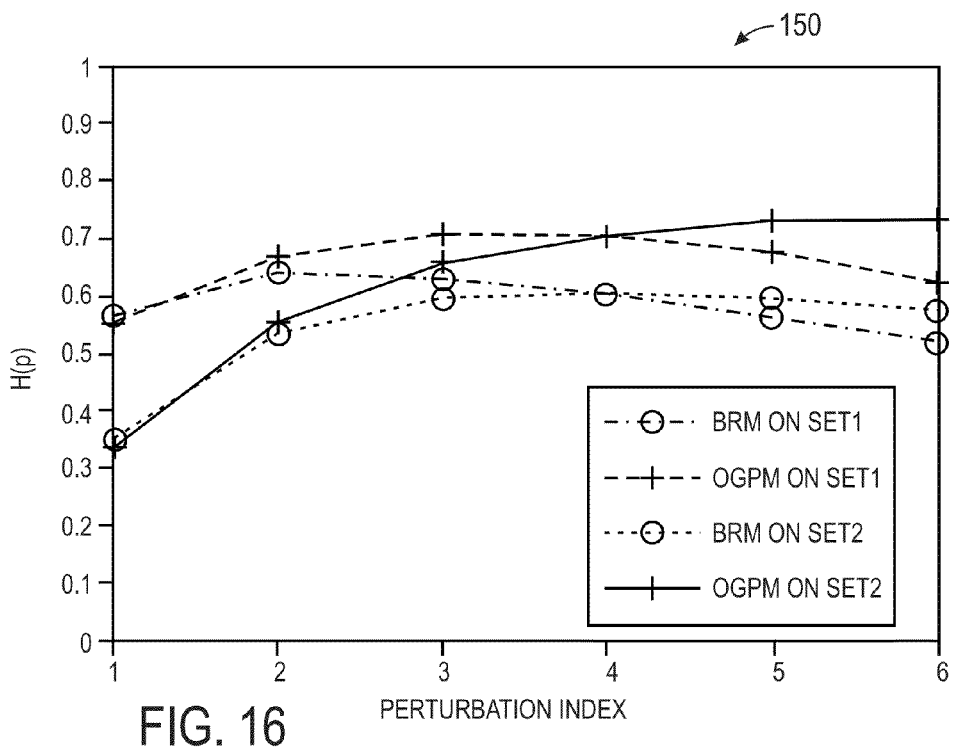
Figure 17:
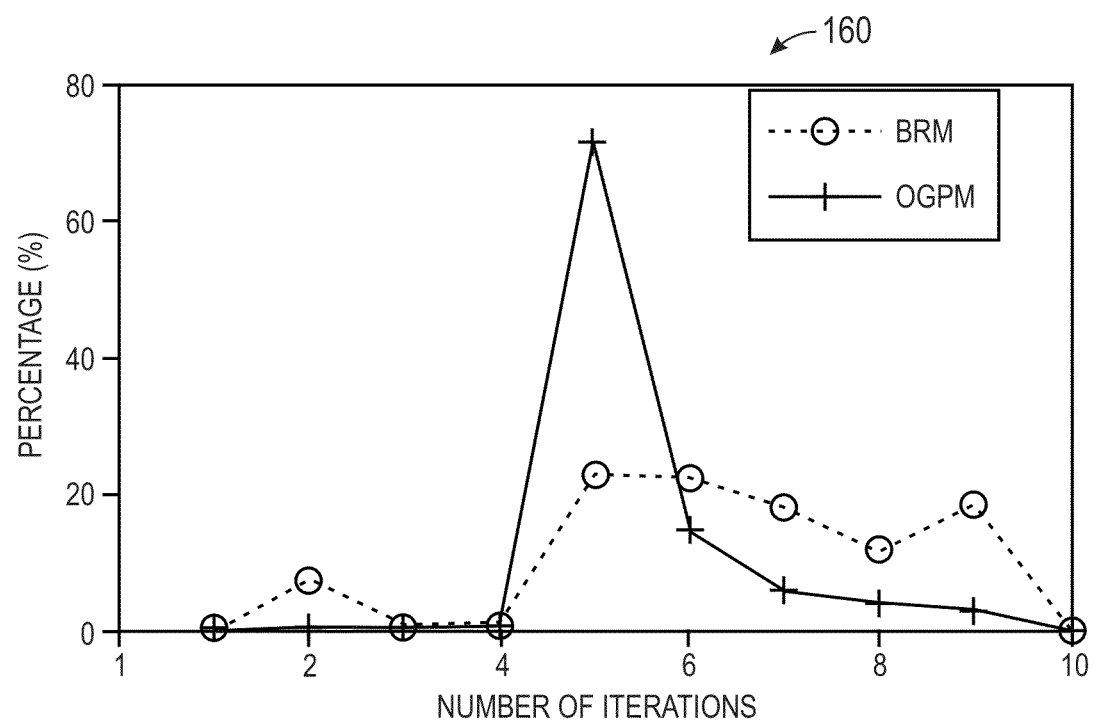
Figure 18:
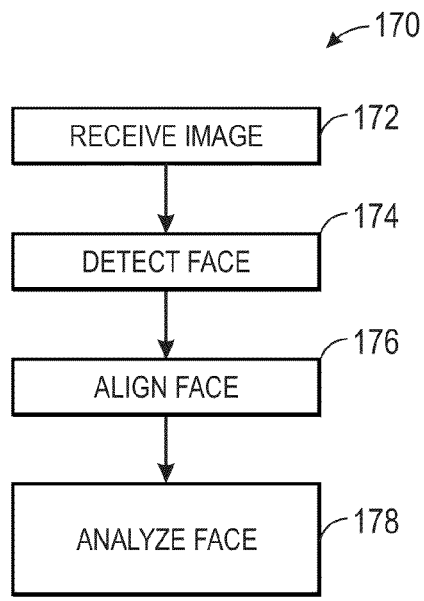
Figure 19:
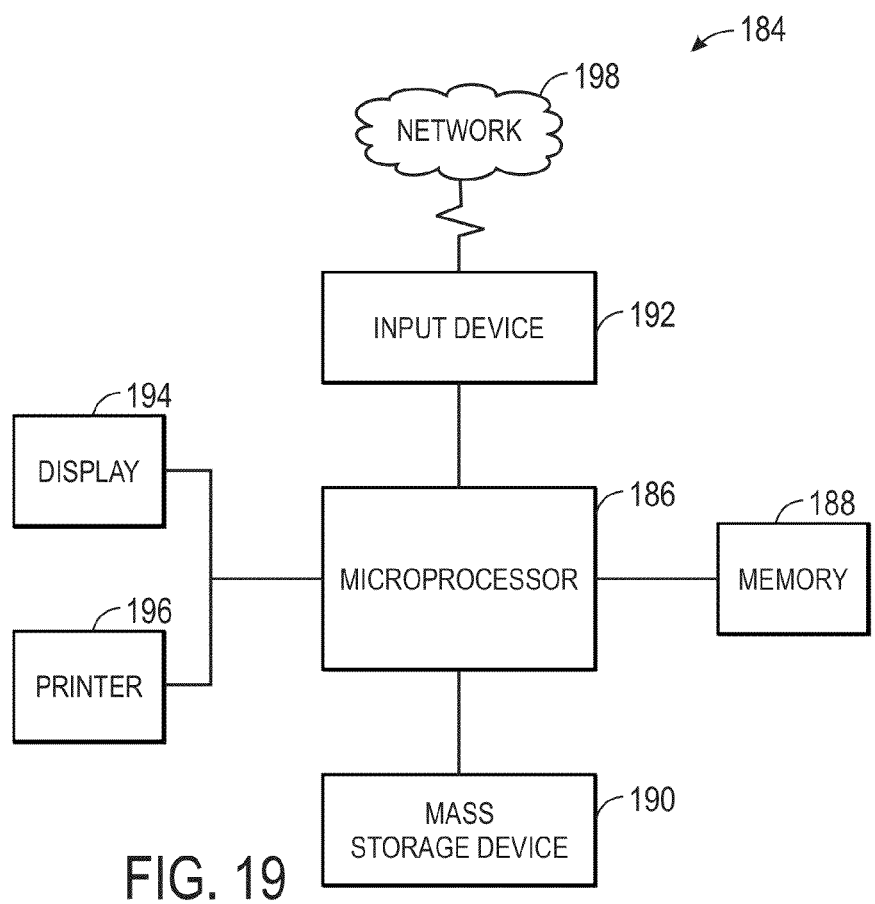

FIG. 8 generally depicts a process for estimating an alignment score function in accordance with an embodiment of the present disclosure;

FIGS. 9 and 10 depict the top fifteen Haar features selected by a learning algorithm in accordance with an embodiment of the present disclosure;

FIG. 11 is a spatial density map of the top one hundred Haar features selected by the learning algorithm of FIGS. 8 and 9 in accordance with an embodiment of the present disclosure;

FIGS. 12-14 are example images from three datasets in accordance with an embodiment of the present disclosure;

FIG. 15 is a graph comparing the ranking performance of the learning algorithm of an embodiment of the present disclosure with that of BRM;

FIG. 16 is a graph comparing angle estimation performance of the learning algorithm of an embodiment of the present disclosure with that of BRM;

FIG. 17 is a graph comparing alignment speed performance of the learning algorithm of an embodiment of the present disclosure with that of BRM; and FIG. 18 is an example of a facial analysis process in accordance with an embodiment of the present disclosure; and FIG. 19 is a block diagram of a processor-based device or system for providing the functionality described in the present disclosure and in accordance with an embodiment of the present disclosure.

DETAILED DESCRIPTION

One or more specific embodiments of the presently disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present techniques, the articles "a," "an," "the," and "said" are intended to mean that there are one or more of the elements. The terms "comprising," "including," and "having" are intended to be inclusive and mean that there may be additional elements other than the listed elements.

Figure 1:
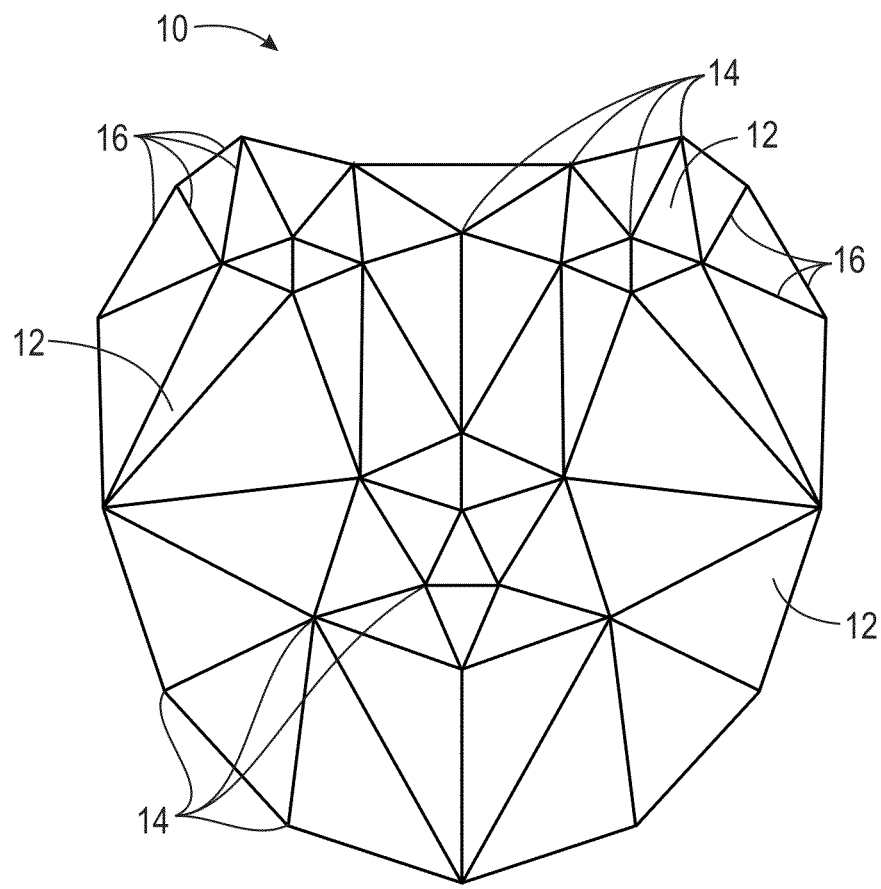
FIG. 1 is a face shape template in accordance with an embodiment of the present disclosure.

Image alignment is the process of moving and deforming a landmark-based generic mesh to an image (e.g., a facial image) to allow image features (e.g., facial features) to be located accurately. Some alignment models include a shape model component and an appearance model component. Given an image, landmark points may be located to quantify the shape of the image. In facial image alignment, for example, the shape model may include landmark points which correspond to facial features (e.g., tip of nose, corners of mouth, etc.). An example mean shape 10, as illustrated in FIG. 1, may include a number of triangles 12 defined by landmark points 14 and line segments 16.

Figure 2:
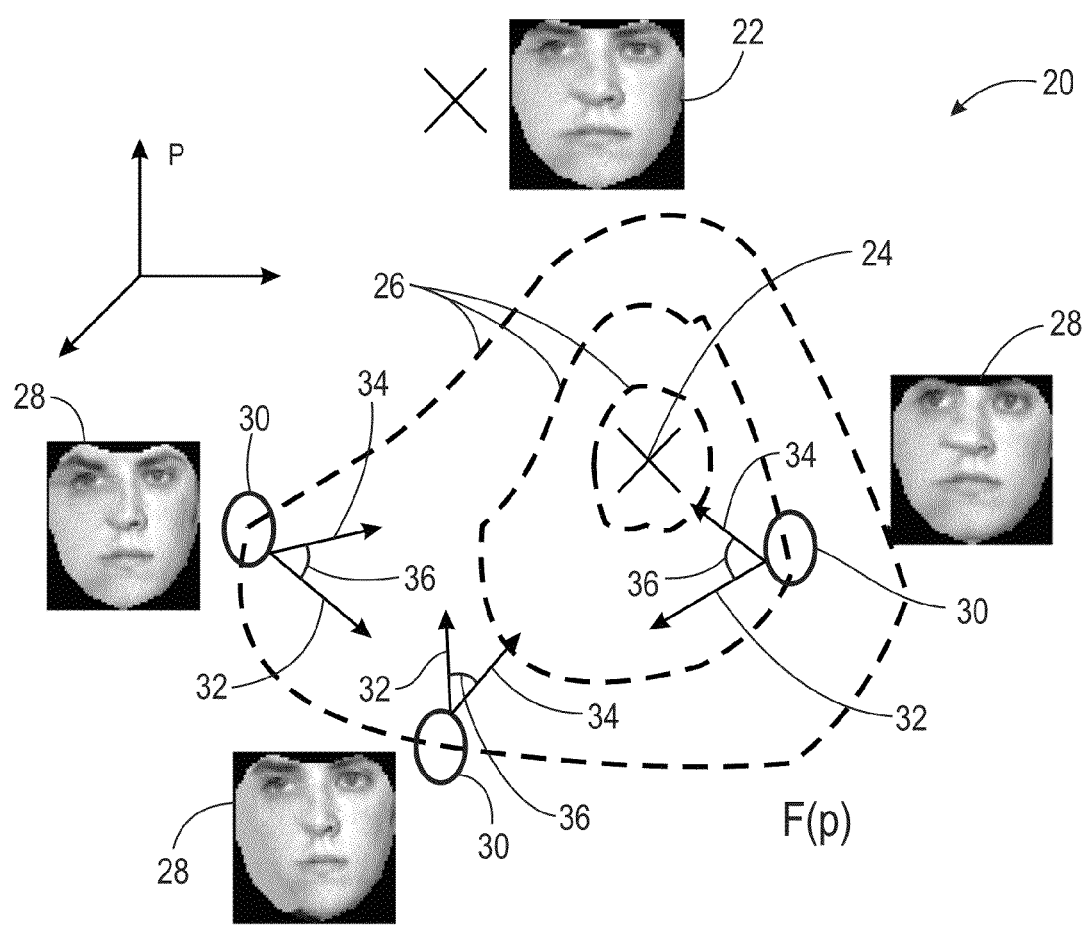
FIG. 2 depicts an example of a concave alignment score function learned via BRM.
Figure 3:
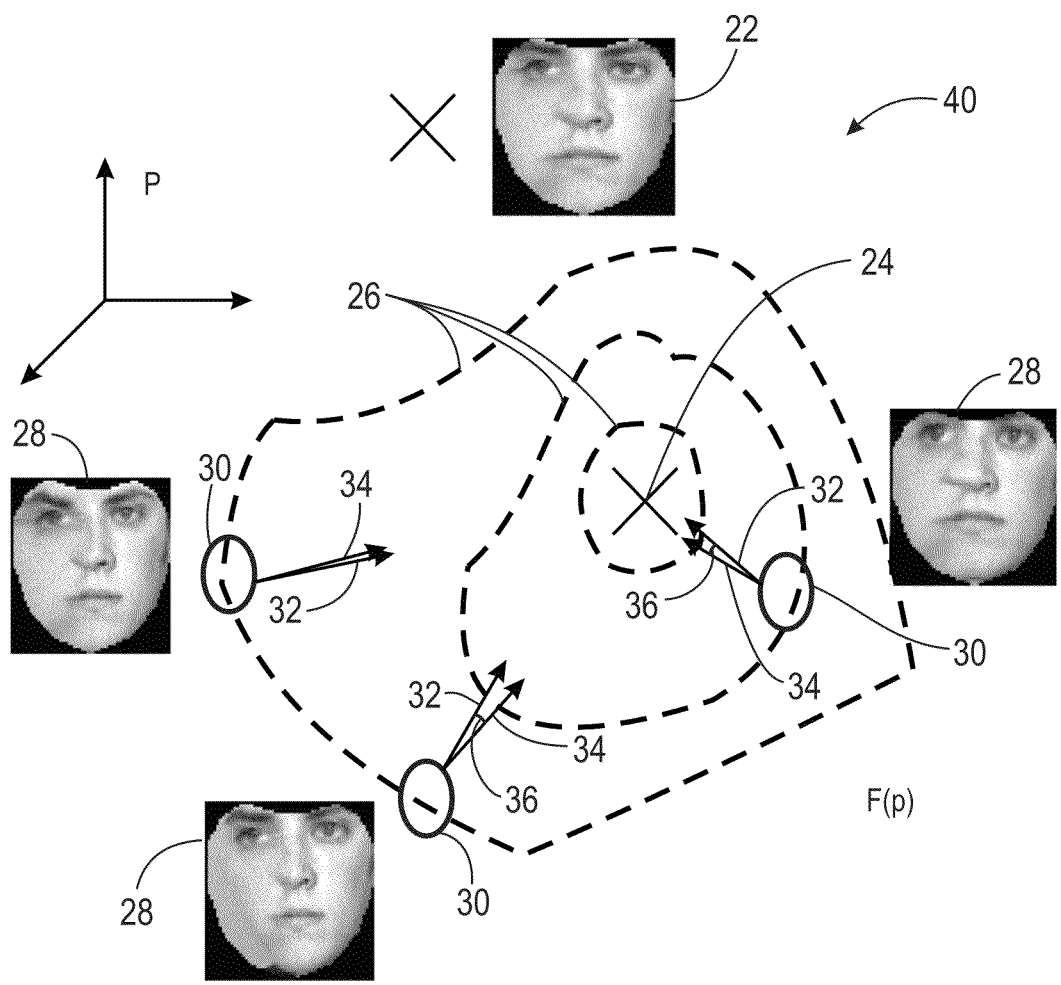
FIG. 3 depicts an alignment score function in which gradient directions are more closely aligned with ideal travel directions in accordance with an embodiment of the present disclosure.

The appearance model may generally include a learned alignment score function, as generally represented in FIGS. 2 and 3. An example of an alignment score function learned through BRM is generally illustrated as graph 20 in FIG. 2. In this concave function, a ground-truth shape parameter 22 represents a maximum value 24 of the function (i.e., a desired alignment), while each line 26 represents points of equal magnitude to the other points on the respective line 26. The score for various perturbed shape parameters 28 are graphed as elements 30 with gradient directions 32. But in BRM a gradient direction 32 can still have a relatively large angle 36 with respect to a vector 34 pointing to the ground-truth shape parameter 22 (i.e., value 24) starting from the current shape parameter element 30. Hence, while in BRM the shape parameter may be updated along the gradient direction 32, the alignment process in BRM may take a convoluted path during the optimization due to the relatively large angles 36. This not only increases the chances of divergence, but also slows down the alignment.

To address this issue, one embodiment of the present technique instead uses the Optimal Gradient Pursuit Model (OGPM) described below to learn a discriminative alignment model also including shape and appearance model components. Using the same shape representation as BAM and BRM, the learning of the OGPM appearance model component, which is also an alignment score function, is formulated with a very different objective. Particularly, as generally represented by graph 40 in FIG. 3, the appearance model aims to learn an alignment score function whose gradients 32 at various perturbed shape parameters 28 (graphically represented by reference numerals 30) have the minimal angle 36 with respect to the ideal travel direction (i.e., the vector 34 pointing directly to the ground-truth shape parameter). The score function may include or be composed of a set of weak functions, each operating on one local feature in the warped image domain. The objective function is formulated such that each weak function can be estimated in an incremental manner from a large pool of feature candidates. During the model fitting, given an image with an initial shape parameter, gradient ascent is performed by updating the shape parameter in the gradient direction, which in OGPM is expected to be more similar to the ideal travel direction due to the optimization of the angles 36 between the gradients 32 and the vectors 34. Additional details of the presently disclosed alignment model are provided below. While certain embodiments relating to a face model and facial alignment are described below for the sake of explanation, it is again noted that the use of the models and alignment techniques in other image contexts (i.e. non-facial) is also envisaged.

Face Model

Similar to BAM and BRM, a face model of one embodiment is composed of or includes a generative shape model component and a discriminative appearance model component. With respect to the shape model, it is noted that landmark-based shape representation is a popular way to describe the facial shape of an image. That is, a set of 2D landmarks, $\{x_i, y_i\}_{i=1,\ldots,\nu}$, may be placed on top of key facial features, such as eye corner, mouth corner, and nose tip, for example. The concatenation of these landmarks forms shape observations of an image, $s=[x_1, y_1, x_2, y_2, \ldots, x_\nu, y_\nu]^T$. Given a face database where each image is manually labeled with landmarks, the entire set of shape observations may be treated as the training data for the shape model. In one embodiment, the shape model may be a Point Distribution Model (PDM) learned via Principal Component Analysis (PCA) on the observation set. Thus, the learned generative PDM can represent a particular shape instance as:

$$s(p) = s_0 + \sum_{i=1}^{p} p_i s_i, \quad (1)$$

where $s_0$ and $s_i$ are the mean shape and $i^{th}$ shape basis, respectively, resulting from the PDM learning. The shape parameter may be given by $p=[p_1, p_2, \ldots, p_n]^T$. Similar to the shape component of AAM, the first four shape bases may be trained to represent global translation and rotation, while the remaining shape bases may represent the non-rigid deformation of facial shapes.

Figure 4:
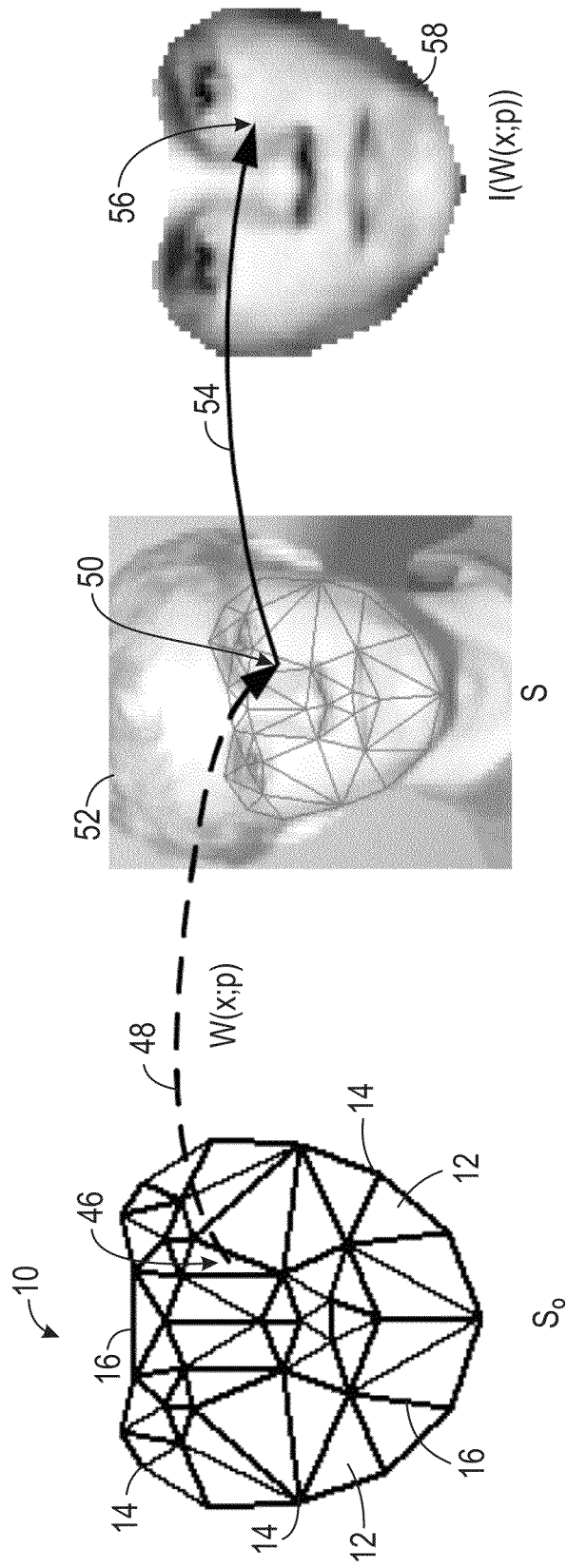
FIG. 4 is an example of an observation image and a face image warped utilizing the face shape template in accordance with an embodiment of the present disclosure.

As shown in FIG. 4, a warping function 48 from the mean shape coordinate system to the coordinates in the image observation 52 is defined as a piece-wise affine warp:

$$W(x^0, y^0; p) = [1 x^0 y^0] a(p), \quad (2)$$

where $(x^0, y^0)$ is a pixel coordinate 46 within the mean shape domain, and $a(p)=[a_1(p) a_2(p)]$ is a unique 3×2 affine transformation matrix that relates each triangle pair in $s_0$ and $s(p)$. Given a shape parameter p, a(p) may be computed for each triangle 12. However, since the knowledge of which triangle each pixel $(x^0, y^0)$ belongs to is known a priori, the warp can be efficiently performed via a simple table lookup. Using this warping function 48, any face image 52 can be warped 54 into the mean shape (generally represented for one pixel by reference numerals 50 and 56) and results in a shape-normalized face image I(W(x; p)), generally represented by reference numeral 58, from which the appearance model is learned.

Figure 5:
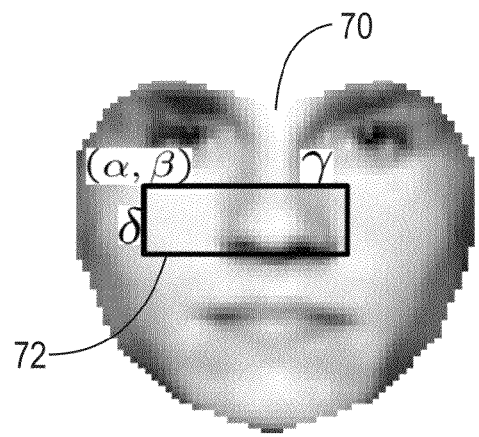
FIG. 5 is an example of a warped face image with feature parameterization in accordance with an embodiment of the present disclosure.
Figure 6:
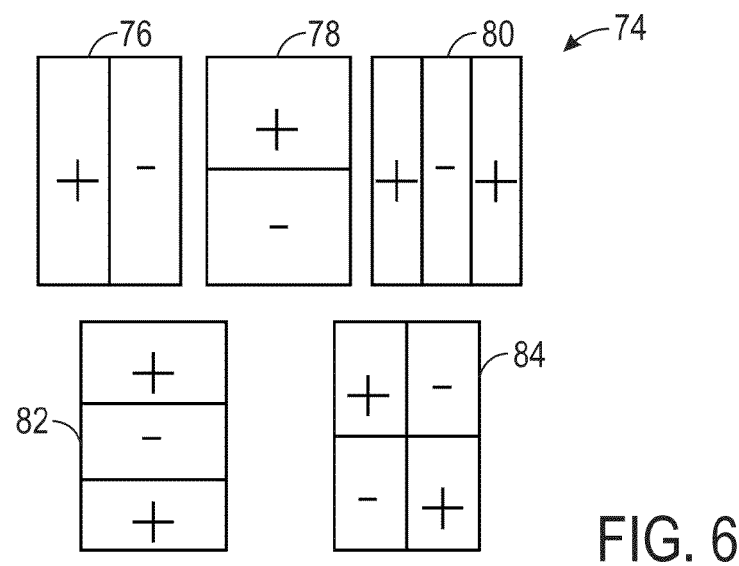
FIG. 6 depicts examples of rectangular feature types that may be used by an appearance model in accordance with an embodiment of the present disclosure.
Figure 7:
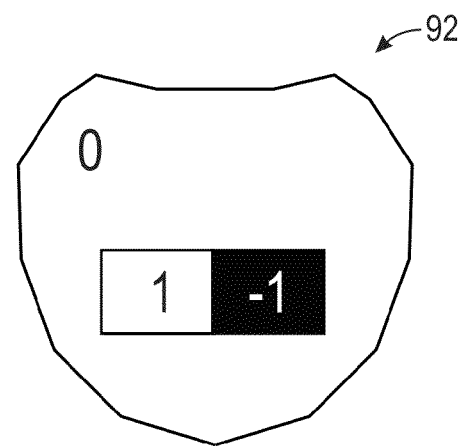
FIG. 7 is an example of a feature template in accordance with an embodiment of the present disclosure.

One embodiment of the appearance model may be better understood with reference to FIGS. 5-7. Particularly, FIG. 5 depicts an example of a warped image 70 having a parameterized feature 72. FIG. 6 depicts five feature types 74 (individually labeled as feature types 76, 78, 80, 82, and 84) that may be used by the appearance model. Further, FIG. 7 generally represents a notional image template A (reference numeral 92).

The appearance model of one embodiment is described by a collection of m local features $\{\phi_i\}_{i=1,\ldots,m}$ that are computed on the shape-normalized face image I(W(x; p)). The local features of one embodiment may be Haar-like rectangular features (e.g., feature 72), which may provide benefits with respect to computational efficiency (e.g., due to an integral image technique). A rectangular feature can be computed as follows:

$$\phi \doteq A^T I(W(x;p)), \quad (3)$$

where A is an image template 92. The inner product between the template and the warped image is equivalent to computing the rectangular feature using the integral image. As shown in FIG. 5, the image template A can be parameterized by $(\alpha, \gamma, \delta, \tau)$, where $(\alpha, \beta)$ is the top-left corner, $\gamma$ and $\delta$ are the width and height, and $\tau$ is the feature type 74.

Alignment Learning

Having introduced the appearance model representation, we now turn to how to train an appearance model of the present technique. In one embodiment, the appearance model may include, or consist of, an alignment score function that will be used during the model fitting stage. To begin with, p may be denoted as the shape parameter of a given image that represents the current alignment of the shape model of Equation (1). In one embodiment, the goal of appearance model learning may be stated as: From labeled training data, we aim to learn a score function F(p), such that, when maximized with respect to p, it will result in the shape parameter of the correct alignment. Specifically, using this goal, if $p_0$ is the shape parameter corresponding to the correct alignment of an image, F has to be such that $$p_0 = \arg\max_p F(p). \quad (4)$$

Given the above equation, F(p) may be optimized via gradient ascent. That is, by assuming that F is differentiable, the shape parameter may be iteratively updated in each alignment iteration starting from an initial parameter $p^{(0)}$ $$p^{(i+1)} = p^{(i)} + \lambda \frac{\partial F}{\partial p}, \quad (5)$$

where $\lambda$ is a step size. After k iterations when the alignment process converges, the alignment is considered successful if the Euclidean distance $\|p^{(k)} - p_0\|$ is less than a pre-defined threshold.

From Equation (5), it is clear that $$\frac{\partial F}{\partial p}$$

indicates the travel direction of the shape parameter p. Because the final destination of such traveling is $p_0$, the ideal travel direction should be the vector that points to $p_0$ starting from p, which is denoted as $\vec{p}^+$:

$$\vec{p}^+ \doteq \frac{p_0 - p}{\|p_0 - p\|}. \quad (6)$$

Similarly, the worst travel direction is the opposite direction of $\vec{p}^+$, i.e., $\vec{p}^- = -\vec{p}^+$. Hence, during the learning of the score function F, it is desired that $$H(p; \vec{p}) = \frac{\frac{\partial F}{\partial p}}{\left\|\frac{\partial F}{\partial p}\right\|} \vec{p}, \quad (7)$$

has a direction that is as similar to the ideal travel direction $\vec{p}^+$ as possible, or equivalently, as dissimilar to the worst travel direction $\vec{p}^-$ possible. Specifically, if we define a classifier $$\frac{\partial F}{\partial p}$$

which is the inner product between two unit vectors and is also the cosine response of the angle between these two vectors, then we have $$H(p; \vec{p}) = \begin{cases} +1 & \text{if } \vec{p} = \vec{p}^+, \\ -1 & \text{if } \vec{p} = \vec{p}^-. \end{cases} \quad (8)$$

In practice, it is hard to expect H(p) can always equal to 1 or −1 as shown in the above equation. Thus, the objective function of learning the H classifier may be formulated as, $$\arg\min_F \sum_p \left(H(p; \vec{p}^+) - 1\right)^2, \quad (9)$$

where only the ideal travel direction $\vec{p}^+$ is used since it can represent the constraint from $\vec{p}^-$ as well. From here on, $\vec{p}^+$ will be simplified as $\vec{p}$ for clarity. This objective function essentially aims to estimate a function F such that its gradient direction has minimal angle with respect to the ideal travel direction, at all possible shape parameters p for all training data.

In one embodiment, a solution in minimizing the objective function (9) may be provided in the manner depicted in FIG. 8 and as described below. First, let us assume the alignment score function uses a simple additive model:

$$F(p; m) \doteq \sum_{i=1}^{m} f_i(p), \quad (10)$$

where $f_i(p)$ is a weak function that operates on one rectangular feature $\phi_i$. Therefore, the gradient of F is also in an additive form:

$$\frac{\partial F(p; m)}{\partial p} = \sum_{i=1}^{m} \frac{\partial f_i}{\partial p}.$$

By plugging this into Equation (7), we have:

$$H(p; \vec{p}, m) = \frac{\sum_{i=1}^{m} \frac{\partial f_i}{\partial p}}{\left\|\sum_{i=1}^{m} \frac{\partial f_i}{\partial p}\right\|} \vec{p} \quad (11)$$

$$= \frac{H(p; \vec{p}, m-1)\left\|\frac{\partial F(p; m-1)}{\partial p}\right\| + \frac{\partial f_m}{\partial p}\vec{p}}{\left\|\frac{\partial F(p; m-1)}{\partial p} + \frac{\partial f_m}{\partial p}\right\|}.$$

Given the fact that H function can be written in a recursive fashion, incremental estimation may be used to minimize the objective function (9). That is, by defining a set of training samples and a hypothesis space from which the rectangle feature can be chosen, each weak function $f_i$ may be interatively estimated and incrementally added into the target function F. Additional details of the example parts of a learning process of one embodiment are described below.

In the appearance learning of one embodiment, a training sample is an N-dimensional warped image I(W(x; p)). Given a face database $\{I_i\}_{i \in [1,K]}$ with manually labeled landmarks $\{s_i\}$, for each face image $I_i$, Equation (1) may be used to compute the ground-truth shape parameter $p_{0,i}$, and then synthesize a number of "incorrect" shape parameters $\{p_{j,i}\}_{j \in [1,U]}$ by random perturbation. Equation (12) below describes one example of perturbation, where v is a n-dimensional vector with each element uniformly distributed within [−1,1], μ is the vectorized eigenvalues of all shape bases in the PDM, perturbation index σ is a constant scale that controls the range of perturbation, and ○ represents the entrywise product of two equal-length vectors.

$$p_{j,i} = p_i + \sigma v \circ \mu. \quad (12)$$

Then, the set of warped images $I_i(W(x; p_{j,i}))$ may be treated as positive training samples ($y_i$=1) for the learning. Together with the ideal travel direction, this may constitute our training set:

$$\mathfrak{P} \doteq \{I_i(W(x; p_{j,i})), \vec{p}_{j,i}\}_{i=1,\ldots,K; j=1,\ldots,U}. \quad (13)$$

In one embodiment, the weak function $f_i$ is defined as:

$$f_i(p) \doteq \frac{2}{\pi}\arctan(g_i \varphi_i(p) - t_i), \quad (14)$$

where $g_i = \pm 1$, and the normalizing constant ensures that $f_i$ stays within the range of [−1, 1]. This choice may be based on several considerations. First, $f_i$ has to be differentiable because we assume F is a differentiable function. Second, it may be desired that each function $f_i$ operates on only one rectangular feature $\phi_i$. Within the mean shape space, all possible locations, sizes, and types of the rectangular features form the hypothesis space $\mathcal{F} = \{\alpha, \beta, \gamma, \delta, \tau\}$, from which the best feature can be chosen at each iteration.

One procedure for learning the alignment score function (10) is provided as Algorithm 1 in the table below:

Algorithm 1: Model learning of OGPM

Data: Positive samples $\mathfrak{P}$ from Equation (13)
Result: The alignment score function F
1 Initialize the score function F = 0
2 foreach t = 1, ..., m do 3 | Fit $f_t$ in the weighted least squares sense, such that $$f_t = \arg\min_f \sum_{ij}(1 - H(p_{j,i}; \vec{p}_i, t))^2 \quad (15)$$

4 | Update $H(p_{j,i}; \vec{p}_i, t)$ with $f_t$
5 | F ← F + $f_t$ 6 return F = $\Sigma_{t=1}^{m} f_t$.

This algorithm is also generally depicted in FIG. 8 in accordance with one embodiment, in which a process 96 estimates an alignment score function based on a set of samples 98 from Equation (13) above.

Particularly, in the process 96, the alignment score function F may be initialized at block 100 (corresponding to Step 1 in the above algorithm) A weak function $f_i$ may be fit at block 102 in the manner described in Step 3 of the above algorithm. It is noted that Step 3 in the above algorithm is the most computationally intensive step since the entire hypothesis space is exhaustively searched. In Step 3, the best feature is chosen based on the $L^2$ distance of H with respect to 1, rather than that of the weak classifier in boosting-based learning. The classifier function H may then be updated with $f_t$ at block 104 (corresponding to Step 4 in the above algorithm), and $f_t$ may be added to the alignment score function F (corresponding to Step 5 in the above algorithm) at block 106. Steps 3-5 of the algorithm may be repeated for each t, as generally represented by blocks 108 and 110 and return loop 112 of FIG. 8 (corresponding to Step 2 above). At its conclusion, the process 96 may return an estimate of the alignment score function equal to the sum of the set of weak functions at block 114.

In essence, learning the score function F is equivalent to learning the set of features $\{\phi_i\}$, the thresholds $\{t_i\}$, and the feature signs $\{g_i\}$. In practical implementation, one may set $g_i$=+1, and $g_i$=−1 respectively and estimate the optimal threshold for both cases. Eventually $g_i$ will be set based on which case has a smaller error (Equation 15). The optimal threshold may be estimated by binary searching in the range of feature values $\phi_i$ such that the error is minimized.

The final set of triples $\{(\phi_i, g_i, t_i)\}_{i=1,\ldots,m}$, together with the shape model $\{s_i\}_{i=1,\ldots,n}$ is referred to herein as an Optimal Gradient Pursuit Model (OGPM). The top fifteen features selected by the learning algorithm in one embodiment are depicted in FIGS. 9 and 10. Particularly, FIG. 9 provides a representation 118 of the top five Haar features 120 selected by the learning algorithm, and FIG. 10 provides a representation 124 of the next ten Haar features 126 selected by the learning algorithm. A spatial density map 130 of the top one hundred Haar features selected by the learning algorithm in the same embodiment is also provided in FIG. 11. It is noted that many selected features are aligned with the boundaries of the facial features.

Face Alignment

In one embodiment, an OGPM may be fit to the face of a given image I, with an initial shape parameter $p^{(0)}$ (at the 0-th iteration), in the manner described below. As shown in Equation (5), the alignment may be iteratively performed by using the gradient ascent approach. From Equations (3), (10), and (14), one can see that the derivative of F with respect to p is $$\frac{\partial F}{\partial p} = \frac{2}{\pi}\sum_{i=1}^{m}\frac{g_i\left(\nabla I \frac{\partial W}{\partial p}\right)^T A_i}{1+(g_i A_i^T I(W(x;p))-t_i)^2}, \quad (16)$$

where $\nabla I$ is the gradient of the image evaluated at W(x; p), and $$\frac{\partial W}{\partial p}$$

is the Jacobian of the warp evaluated at p. A discussion on the alignment procedure, the computational complexity, and efficient implementation of $$\frac{\partial F}{\partial p}$$

for BAM may be found in a publication by Xioaming Liu entitled "Discriminative Face Alignment" (*IEEE Trans. On Pattern Analysis and Machine Intelligence*, 31(11):1941-1954, November 2009). But in contrast to a BAM-based fitting, the present technique uses a step size λ that is dynamically determined via line searching, rather than a simple static constant. That is, at each iteration, the optimal λ within a certain range is sought such that the updated shape parameter can maximally increase the current score function value F(p).

Experimental Results

The following experimental results were obtained using an experimental dataset containing 964 images from three public available databases, namely the ND1, FERET, and BioID databases. Each of the 964 images includes 33 manually labeled landmarks. To speed up the training process, for purposes of this experiment, the image set was down-sampled such that the facial width is roughly 40 pixels across the set. Sample images 134 of the ND1, FERET, and BioID databases are illustrated in FIGS. 12, 13, and 14, respectively. As shown in Table 1 below, all images were partitioned into three non-overlapping datasets. Set 1 included 400 images (one image per subject) from two databases. Set 2 included 334 images from the same subjects but different images as the ND1 database in Set 1. Set 3 included 230 images from 23 subjects in the BioID database that were never used in the training Set 1 was used as the training set for the model learning and all three sets were used for testing the model fitting. The motivation for such a partition was to experiment various levels of generalization capability. For example, Set 2 could be tested as the unseen data of seen subjects; and Set 3 could be tested as the unseen data of unseen subjects—a more challenging case and more similar to the scenario in practical applications.

TABLE 1

Summary of the dataset.

| | ND1 | FERET | BioID |
|---|---|---|---|
| Images | 534 | 200 | 230 |
| Subjects | 200 | 200 | 23 |
| Variations | Frontal view | Pose | Background, lighting |
| Set 1 | 200 | 200 | |
| Set 2 | 334 | | |
| Set 3 | | | 230 |

In the experiments, the OGPM algorithm described above was compared with BRM based on two considerations. First, the OGPM algorithm could be considered an extension of BRM. Second, it has been shown that BRM outperforms other discriminative image alignment techniques, such as BAM. During the model learning, both BRM and OGPM were trained from 400 images of Set 1. BRM used 24000 (=400×10×6) training samples synthesized from Set 1, where each image synthesized 10 profile lines and each line had 6 evenly spaced samples. In comparison, OGPM used 12000 training samples, where each image synthesized 30 samples according to Equation (12). Fewer samples could be used for OGPM because all synthesized samples were randomly spread out, rather than multiple samples selected from one profile line as in BRM, allowing good performance to be achieved with less training samples. The manually labeled landmarks of Set 1 images were improved using an automatic model refinement approach described in a publication by Xiaoming Liu et al., entitled "Face Model Fitting on Low Resolution Images" (In *Proc. Of the British Machine Vision Conference (BMVC)*, vol. 3, pp. 1079-1088, 2006). After model learning, the shape model component of both BRM and OGPM was a PDM with 9 shape bases, and their appearance models (i.e., the alignment score functions) had 100 weak classifiers/functions.

BRM aims to improve the convexity of the learned score function by correctly ranking pairs of warped images. OGPM extends BRM in the sense that the score function should not only be concave, but also have minimal angle between the gradient direction and the vector pointing to the ground-truth shape parameter. Hence, convexity is a good metric for evaluating the score functions for both BRM and OGPM. Similar to BRM, the convexity in the experiment was measured by computing the percentage of correctly ranked pairs of warped images. Given Set 1 and Set 2, two respective sets of pairs were synthesized and the ranking performance of BRM and OGPM were tested. As shown by graph 140 in FIG. 15, the perturbation index u controls the amount of perturbation of the image pair (see Equation 12). We can see that for both sets, OGPM achieved very similar ranking performance as BRM, despite the fact that, unlike BRM, OGPM does not utilize ranking in its objective function directly. BRM exhibited in slightly better performance when the perturbation was very small ($\sigma=1$). But it is believed that this may be attributed mostly to labeling error in the training data since a small perturbation of a labeled landmark can also be treated as a fairly good alignment, which makes the ranking harder.

In addition to the convexity measure, we also validated the estimation of the angle between the gradient direction and the vector pointing to the ground-truth shape parameter. The minimization of this angle is the objective function of OGPM, as represented by the H(p) function. Similar to the aforementioned ranking experiments, given the Set 1, we randomly synthesized six sets of warped images using various perturbation indexes u. Then for each image in a set, we computed the H(p) score, and plotted the average score of each set in graph 150 of FIG. 16. Similar experiments were conducted for Set 2 as well. Even though OGPM and BRM have similar ranking performance, OGPM achieves a larger function score for both Set 1 and 2, and hence a smaller gradient angle. This demonstrates that using ranking performance as the objective, as done by BRM, does not guarantee the optimal angle estimation, and that directly using the gradient angle as the objective function, as done by OGPM, may be used to obtain a better alignment score function.

TABLE 2

Alignment performance (pixels) comparison on three sets.
($\sigma$ indicates the amount of perturbation.)

| $\sigma$ | | 2 | 4 | 6 | 8 |
|---|---|---|---|---|---|
| Set 1 | BRM | 0.50 | 1.12 | 1.30 | 1.45 |
| | OGPM | 0.47 | 0.57 | 0.70 | 0.87 |
| Set 2 | BRM | 0.88 | 0.94 | 1.02 | 1.12 |
| | OGPM | 0.58 | 0.72 | 0.81 | 0.93 |
| Set 3 | BRM | 0.85 | 1.34 | 1.59 | 1.94 |
| | OGPM | 0.80 | 1.12 | 1.35 | 1.60 |

In alignment experiments, the model fitting algorithm was run on each image with a number of initial landmarks and the alignment results were evaluated. The initial landmarks were generated using Equation (12), i.e., by randomly perturbing the ground-truth landmarks by an independent uniform distribution whose range equals to a multiple ($\sigma$) of the eigenvalue of shape basis during PDM training Once fitting on one image terminated, the alignment performance was measured by the resultant Root Mean Square Error (RMSE) between the aligned landmarks and the ground-truth landmarks.

We conducted the alignment experiments for all three sets using both OGPM and BRM. Table 2, above, shows the RMSE results in terms of pixels, where each element is an average of more than 2000 trials at one particular perturbation index u. Hence, each image in Set 1, 2, and 3 was tested with five, six, and nine random trials, respectively. OGPM and BRM were tested under the same conditions. For example, both algorithms were initialized with the same random trials and the termination condition was the same as well. That is, the alignment iteration exited if the alignment score F(p) could not increase further, or the landmark difference (RMSE) between consecutive iterations was less than a predefined threshold, such as 0.05 pixels in the presently described experiment.

From Table 2, one can see that for all three sets, OGPM was able to achieve better alignment performance than BRM. Note that the performance gain was more when the initial perturbation was relatively large, such as $\sigma=6$ or 8, which are the most challenging cases in practical applications. Given the fact that the test images were in very low resolution, this represents substantial performance improvement. Comparing among the three data sets, the performance gain in the training set (Set 1) was larger compared to the other two data sets.

One strength of smaller gradient angles is the ability to converge in less iterations during the alignment. In FIG. 17, a histogram 160 is provided depicting the number of iterations that OGPM and BRM required in the experiment to converge on Set 3 when $\sigma=8$. It can be seen that, on average, OGPM can converge faster than BRM. In the experiment, the average number of iterations of OGPM was 5.47, while that of BRM was 6.40. Similarly, on Set 1, the average number of iterations of OGPM was 5.08, and that of BRM was 6.09 when $\sigma=8$.

The image alignment technique described in this disclosure may be used in conjunction with numerous other processing techniques to achieve desired results. For instance, as generally depicted in FIG. 18 in accordance with one embodiment, the disclosed image alignment technique may be used in a facial analysis process 170. As an example, such a process 170 may include receiving an image and detecting one or more faces in the image, as generally illustrated by blocks 172 and 174. The detected faces may be aligned, such as through the presently disclosed techniques, as generally depicted by block 176. The aligned faces may then be analyzed at block 178, such as for facial recognition by comparing the aligned faces to reference data to identify persons in the image or for pose estimation.

Finally, it is noted that the functionality described in this disclosure (e.g., image detection, alignment, and analysis) may be performed by a processor-based system, such as a computer. An example of such a system is provided in FIG. 19 in accordance with one embodiment. The depicted processor-based system 184 may be a general-purpose computer, such as a personal computer, configured to run a variety of software, including software implementing all or part of the functionality described herein. Alternatively, the processor-based system 184 may include, among other things, a mainframe computer, a distributed computing system, or an application-specific computer or workstation configured to implement all or part of the present technique based on specialized software and/or hardware provided as part of the system. Further, the processor-based system 184 may include either a single processor or a plurality of processors to facilitate implementation of the presently disclosed functionality.

In general, the processor-based system 184 may include a microcontroller or microprocessor 186, such as a central processing unit (CPU), which may execute various routines and processing functions of the system 184. For example, the microprocessor 186 may execute various operating system instructions as well as software routines configured to effect certain processes. The routines may be stored in or provided by an article of manufacture including one or more non-transitory computer-readable media, such as a memory 188 (e.g., a random access memory (RAM) of a personal computer) or one or more mass storage devices 190 (e.g., an internal or external hard drive, a solid-state storage device, an optical disc, a magnetic storage device, or any other suitable storage device). In addition, the microprocessor 186 processes data provided as inputs for various routines or software programs, such as data provided as part of the present techniques in computer-based implementations.

Such data may be stored in, or provided by, the memory 188 or mass storage device 190. Alternatively, such data may be provided to the microprocessor 186 via one or more input devices 192. The input devices 192 may include manual input devices, such as a keyboard, a mouse, or the like. In addition, the input devices 192 may include a network device, such as a wired or wireless Ethernet card, a wireless network adapter, or any of various ports or devices configured to facilitate communication with other devices via any suitable communications network 198, such as a local area network or the Internet. Through such a network device, the system 184 may exchange data and communicate with other networked electronic systems, whether proximate to or remote from the system 184. The network 198 may include various components that facilitate communication, including switches, routers, servers or other computers, network adapters, communications cables, and so forth.

Results generated by the microprocessor 186, such as the results obtained by processing data in accordance with one or more stored routines, may be provided to an operator via one or more output devices, such as a display 194 or a printer 196. Based on the displayed or printed output, an operator may request additional or alternative processing or provide additional or alternative data, such as via the input device 192. Communication between the various components of the processor-based system 184 may typically be accomplished via a chipset and one or more busses or interconnects which electrically connect the components of the system 184.

Technical effects of the invention include improvements in speed, efficiency, and accuracy for facial and non-facial image alignment. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   acquiring an image of an object; and
   via software executed by a processor of a system, using a discriminative alignment model to align a generic mesh to the image to facilitate locating of features of the image that correspond to the object, the discriminative alignment model including a generative shape model component and a discriminative appearance model component, the discriminative appearance model component having been trained with training data to estimate a score function that is a function of a shape parameter of a given image and that seeks to minimize an angle between a gradient direction of the score function for the shape parameter and an ideal alignment travel direction for the shape parameter.

2. The method of claim 1, wherein the discriminative appearance model component has been trained with training data to estimate the score function via an objective function defined as:

$$\operatorname*{argmin}_{F} \sum_{p} (H(p; \vec{p}^{+}) - 1)^{2}$$

for all shape parameters p of the training data, wherein F is the score function and $H(p; \vec{p}^{+})$ is a classifier that equals the inner product between two unit vectors representing the gradient direction and the ideal alignment travel direction, respectively.

3. The method of claim 2, wherein minimizing the objective function includes summing weak functions that each operate on a respective single rectangular feature.

4. The method of claim 1, comprising performing recognition on the image following alignment via additional software executed by the processor.

5. The method of claim 1, wherein acquiring the image of the object includes analyzing image data to detect the image of the object.

6. The method of claim 1, comprising training the discriminative appearance model with the training data.

7. The method of claim 6, comprising optimizing the score function through gradient ascent.

8. The method of claim 6, comprising:
   computing a ground-truth shape parameter for each image of a plurality of images; and
   synthesizing a number of altered shape parameters for each image by random perturbation of the ground-truth shape parameter.

9. The method of claim 8, wherein the training data includes a set of warped images based on the altered shape parameters, and ideal travel directions for the warped images.

10. A manufacture comprising:
    one or more non-transitory, computer-readable media having executable instructions stored thereon, the executable instructions comprising:
    instructions adapted to access an image of an object; and
    instructions adapted to align the object using a discriminative alignment model that includes a discriminative appearance model trained to estimate an alignment score function that minimizes angles between gradient directions of the alignment score function and vectors pointing in the direction of the maximum of the alignment score function.

11. The manufacture of claim 10, wherein the one or more non-transitory, computer-readable media comprises a plurality of non-transitory, computer-readable media at least collectively having the executable instructions stored thereon.

12. The manufacture of claim 10, wherein the one or more non-transitory, computer-readable media include an optical disc, a magnetic disc, a solid-state device, or some combination thereof.

13. The manufacture of claim 10, wherein the one or more non-transitory, computer-readable media include random access memory of a computer.

14. A method comprising:
acquiring a facial image of a person; and
via software executed by a processor of a system, using a discriminative face alignment model to align a generic facial mesh to the facial image to facilitate locating of facial features of the facial image, the discriminative face alignment model including a generative shape model component and a discriminative appearance model component, the discriminative appearance model component having been trained with training data to estimate a score function that is a function of a shape parameter of a given image and that seeks to minimize a measure of divergence, wherein minimizing the measure of divergence comprises minimizing an angle between a gradient direction of the score function for the shape parameter and an ideal alignment travel direction for the shape parameter.

15. The method of claim 14, wherein the discriminative appearance model component has been trained with training data to estimate the score function via an objective function defined as:

$$\operatorname*{argmin}_{F} \sum_{p} \left( H(p; \vec{p}^{+}) - 1 \right)^2$$

for all shape parameters p of the training data, wherein F is the score function and $H(p; \vec{p}^{+})$ is a classifier that equals the inner product between two unit vectors representing the gradient direction and the ideal alignment travel direction, respectively.

16. The method of claim 15, wherein minimizing the objective function includes summing weak functions that each operate on a respective single rectangular facial feature.

17. The method of claim 14, comprising performing facial recognition on the facial image following alignment via additional software executed by the processor.

18. The method of claim 14, wherein acquiring the facial image of the person includes analyzing image data to detect the face of the person.

19. The method of claim 14, comprising training the discriminative appearance model with the training data.

20. The method of claim 19, comprising optimizing the score function through gradient ascent.

21. The method of claim 19, comprising:
computing a ground-truth shape parameter for each facial image of a plurality of facial images; and
synthesizing a number of altered shape parameters for each facial image by random perturbation of the ground-truth shape parameter.

22. The method of claim 21, wherein the training data includes a set of warped images based on the altered shape parameters, and ideal travel directions for the warped images.

* * * * *